United States Patent
Zeira et al.

(10) Patent No.: US 7,492,735 B2
(45) Date of Patent: Feb. 17, 2009

(54) ASSIGNING UPLINK SLOTS TO OPTIMIZE UPLINK POWER CONTROL GAIN IN WIRELESS COMMUNICATIONS

(75) Inventors: Eldad Zeira, Hungtington, NY (US); Sung-Hyuk Shin, Northvale, NJ (US)

(73) Assignee: InterDigital Technology Corporation, Wilmington, DE (US)

( * ) Notice: Subject to any disclaimer, the term of this patent is extended or adjusted under 35 U.S.C. 154(b) by 872 days.

(21) Appl. No.: 10/718,387

(22) Filed: Nov. 20, 2003

(65) Prior Publication Data

US 2004/0141482 A1 Jul. 22, 2004

Related U.S. Application Data

(60) Provisional application No. 60/427,907, filed on Nov. 20, 2002.

(51) Int. Cl.
*H04Q 7/00* (2006.01)
*H04Q 7/28* (2006.01)
*H04B 7/204* (2006.01)
*H04B 7/212* (2006.01)
*H04L 12/43* (2006.01)
*H04Q 7/20* (2006.01)
*H04B 7/00* (2006.01)

(52) U.S. Cl. .............. 370/329; 370/458; 370/335; 370/337; 370/442; 455/452.1; 455/509

(58) Field of Classification Search ............ 370/280, 370/321, 329, 335, 337, 336, 345, 431, 458, 370/468, 442; 455/452.1, 452.2, 509
See application file for complete search history.

(56) References Cited

U.S. PATENT DOCUMENTS

| 5,056,109 | A | 10/1991 | Gilhousen et al. |
| 5,257,402 | A | 10/1993 | Crisler |
| 6,349,094 | B1 | 2/2002 | Vastano et al. |
| 6,381,462 | B1 | 4/2002 | Charas |
| 6,957,070 | B2 * | 10/2005 | Voyer ......................... 455/450 |
| 2002/0003782 | A1 | 1/2002 | Pan et al. |
| 2003/0114179 | A1 * | 6/2003 | Smolyar et al. ............. 455/522 |

FOREIGN PATENT DOCUMENTS

EP 1 233 642 8/2002

OTHER PUBLICATIONS

Agusti et al., "Conceptual Studies on Radio Resource and QoS Management Algorithms", [Online] Mar. 2002, pp. 76-91.
Mihailescu et al., "Dynamic resource allocation for packet transmission in UMTS TDD-CDMA systems", Vehicular Technology Conference, May 1999, pp. 1737-1741.

* cited by examiner

*Primary Examiner*—George Eng
*Assistant Examiner*—Un Cho
(74) *Attorney, Agent, or Firm*—Volpe and Koenig, P.C.

(57) ABSTRACT

A method and system for assigning uplink (UL) slots to optimize time division duplex (TDD) UL power. In order to assure proper power control gain, UL slots are judiciously allocated close to the beacon slot. The UL slots may be allocated based on channel sensing. All users are sorted in the order of reducing fading losses. Sorting information is also used to allocate the UL slots. The UL slots may also be allocated based on signal interference information, code usage availability estimates and spread signal interference values. Alternatively, block error rate (BLER) and signal to interference ratio (SIR) measurements may be used to allocate the UL slots.

4 Claims, 4 Drawing Sheets

ASSIGNING UPLINK SLOTS TO OPTIMIZE UPLINK POWER CONTROL GAIN IN WIRELESS COMMUNICATIONS

CROSS REFERENCE TO RELATED APPLICATION(S)

This application claims priority from U.S. provisional application No. 60/427,907, filed Nov. 20, 2002, which is incorporated by reference as if fully set forth.

FIELD OF THE INVENTION

The present invention relates to spread spectrum communication systems. More particularly, the present invention relates to a system and method for allocating uplink (UL) slots to control transmission power within time division duplex (TDD) communication systems.

BACKGROUND

FIG. 1 depicts a wireless spread spectrum TDD communication system 100. The system 100 has a plurality of base stations $30_1$-$30_7$. Each base station 30 communicates with a plurality of wireless transmit/receive units (WTRUs) in its operating area. For example, base station $30_1$ communicates with WTRUs $32_1$-$32_3$. Communications transmitted from a base station 30 to a WTRU 32 are referred to as downlink communications, and communications transmitted from a WTRU 32 to a base station 30 are referred to as uplink communications.

In a Universal Mobile Telecommunications System (UMTS) as specified by the Third Generation Partnership Project (3GPP), base stations are called Node Bs, subscriber stations are called wireless transmit/receive units (WTRUs) and the wireless CDMA (Code Division Multiple Access) interface between the Node Bs and UEs is known as the Uu interface.

Node Bs are typically capable of conducting wireless concurrent communications with a plurality of subscriber stations, generically known as WTRUs (i.e., User Equipments (UEs)), which include mobile units.

In addition to be able to communicate over different bands of frequency spectra, spread spectrum TDD systems can carry multiple communications over the same band of frequency spectra. Individual communication signals are distinguishable by their respective chip code sequences (codes). FIG. 2 shows two frames 34A, 34B of a TDD signal 200. Each frame 34A, 34B is divided into 15 time slots $36_1$-$36_{15}$. In such systems, a communication is sent multiplexed in selected time slots $36_1$-$36_{15}$ using codes. Accordingly, one repeating frame 34 is capable of carrying multiple communications distinguished by both time slot and codes. The combination of a single code in a single time slot is referred to as a resource unit. One or multiple resource units are assigned to a communication based on the bandwidth required to support the communication.

Most TDD systems adaptively control transmission power levels allowing many base stations and WTRUs to share the same time slots within a radio frequency spectrum. For example, when WTRU $32_1$ is receiving a specific communication from base station $30_1$, all the other WTRUs and base stations communicating using the same time slots and spectrum will generate interference on the downlink communication of base station $30_1$.

One way for base station $30_1$ to ensure delivery of information is by increasing the transmission power level. However, this will degrade the signal quality of all other communications within that time slot and radio frequency spectrum by generating interference. To avoid increasing power of the base station $30_1$, all the other WTRUs and base stations within range may be instructed to decrease their transmit power. However, reducing the transmission power level of these base stations and WTRUs too far, will result in undesirable signal to noise ratios (SNRs) and high bit error rates (BERs) at the receivers.

To maintain both the quality of communications while controlling the transmission power levels, a transmission power control scheme is used. This is especially important on uplink situations where a near-far problem may occur. The near-far problem occurs when a base station (BS) receives a much stronger signal from a WTRU nearby than from another WTRU far away. Since all users share the same frequency band, the near WTRU would drown out the far WTRU. In addition, power control also prolongs battery life while it reduces interference.

One approach using transmission power control in a code division multiple access (CDMA) communication system is described in U.S. Pat. No. 5,056,109 (Gilhousen et al.). A transmitter sends a communication to a particular receiver. Upon reception, the received signal power is measured. The received signal power is compared to a desired received signal power. Based on the comparison, a control bit is sent to the transmitter either increasing or decreasing transmission power by a fixed amount. Since the receiver sends a control signal to the transmitter to control the transmitter's power level, such power control techniques are commonly referred to as closed loop.

Under certain conditions, the performance of a closed loop system will degrade. For example, if communications sent between a WTRU and a base station which are in a highly dynamic environment, such as due to the WTRU moving, such systems may not be able to adapt fast enough to compensate for the changes. The update rate of closed loop power control in TDD is typically 100 cycles per second which is not sufficient to compensate for fast fading channels. For example, a WTRU traveling at 100 kilometers per hour (62 miles per hour) may travel 278 centimeters between updates. In addition, if the WTRU were operating at 881.52 Mhz, the distance traveled between updates would be approximately 294 degrees of a wavelength and may place the WTRU into a deeper null.

Outer loop and weighted open loop power controls are other methods for transmission power control. Outer loop power control utilizes an error detection device to look at the soft symbols and errors produced in a data estimation device. A processor analyzes the detected errors and determines an error rate for the received communication. Based on the averaged error rate, a processor determines a desired target error rate for the communication. The processor determines an amount, if any, the power level needs to be changed at the transmitting station to achieve the desired error rate. An adjustment is subsequently sent to the transmitting station using a dedicated or a reference channel.

To compound the fading problem, a WTRU employing a time slot which is located temporally distant from the reference beacon time slot may reposition itself during this time interval and may move into a deeper null resulting in a deeper fade. For example, a WTRU using time slots in the middle of a standard frame having the fixed length of 10 ms will allow the WTRU to travel an additional one-half wavelength at 108 km/hr. In addition to moving in and out of nulls, the WTRU by its movement introduces Doppler fading into the mix. These affects are more pronounced in systems which have less frequent power control adjustments.

Therefore, compensating for deep fading and Doppler frequency and phase shifting are important to power control gain. In addition to fading and Doppler, the time slot separation between the reference beacon and the WTRU's time slot also has an impact on efficient power control gain. This is especially pronounced in the TDD mode of operation. Consequently, it is desirable to have a method to choose slot locations to optimize uplink power control gain with fading channels while taking into account Doppler effects.

SUMMARY

The present invention provides a method of optimizing uplink (UL) channel power control gain based on channel sensing and the slot separation between a beacon channel and the allocated slot channel within the UL frame of a WTRU. Channels are allocated such that the power control gain is maximized for those channels that require it most. The benefit of judicious channel allocation allows for an increase in the average power control gain, which results in enhanced cell coverage and capacity.

The present invention allocates as many UL slots as practical near the beacon channel(s) providing all WTRUs within the communication system the benefit of a higher power control gain. A WTRU with UL slots closer to the beacon(s) will not be able to travel as far as slots further from the beacon. This is because there is a larger time lag with UL channels further from the beacon. The present invention may be incorporated into an integrated circuit (IC) or be configured in a circuit comprising a multitude of interconnecting components.

In one embodiment, all the WTRUs are sorted in reduced order of estimated fading losses. The sorting information is then taken into account when allocating slots such that users with higher fading losses will be allocated closer to the beacon(s). The fading loss estimates may be performed at the node B directly from the channel estimates and the information transmitted to the controlling radio network controller (CRNC).

In an alternative embodiment, a block error rate (BLER) will be contrasted to a signal to interference ratio (SIR) measurement producing a gauge of the fading. For example, a generally higher BLER for same SIR would indicate deeper fading. The information is readily available at the serving radio network controller (SRNC) as part of the outer loop power control and may be forwarded to the CRNC. The CRNC information may be combined with other information such as slot interference and code availability to decide the optimal slot positioning.

BRIEF DESCRIPTION OF THE DRAWINGS

A more detailed understanding of the invention may be had from the following description of a preferred example, given by way of example and to be understood in conjunction with the accompanying drawings wherein.

DETAILED DESCRIPTION OF THE PREFERRED EMBODIMENTS

In a Universal Mobile Telecommunications System (UMTS) as specified by the Third Generation Partnership Project (3GPP), base stations are called Node Bs, subscriber stations are called UEs and the wireless code division multiple access (CDMA) interface between the Node Bs and UEs is known as the Uu interface.

Node Bs are typically capable of conducting wireless concurrent communications with a plurality of subscriber stations, (i.e., WTRUs), which include mobile units. Generally, the term base station includes but is not limited to a base station, Node-B, site controller, access point or other interfacing device in a wireless environment. The term wireless transmit/receive unit (WTRU) includes but is not limited to a user equipment, mobile station, fixed or mobile subscriber unit, pager or any other type of device capable of operating in a wireless environment. When referred to hereafter, a base station includes but is not limited to a base station, Node-B, site controller, access point or other interfacing device in a wireless environment.

Although the preferred embodiments are described in conjunction with a third generation partnership program (3GPP) code division multiple access (CDMA) system utilizing the TDD mode, the embodiments are applicable to any hybrid CDMA, time division multiple access (TDMA) communication system.

Figure 1:
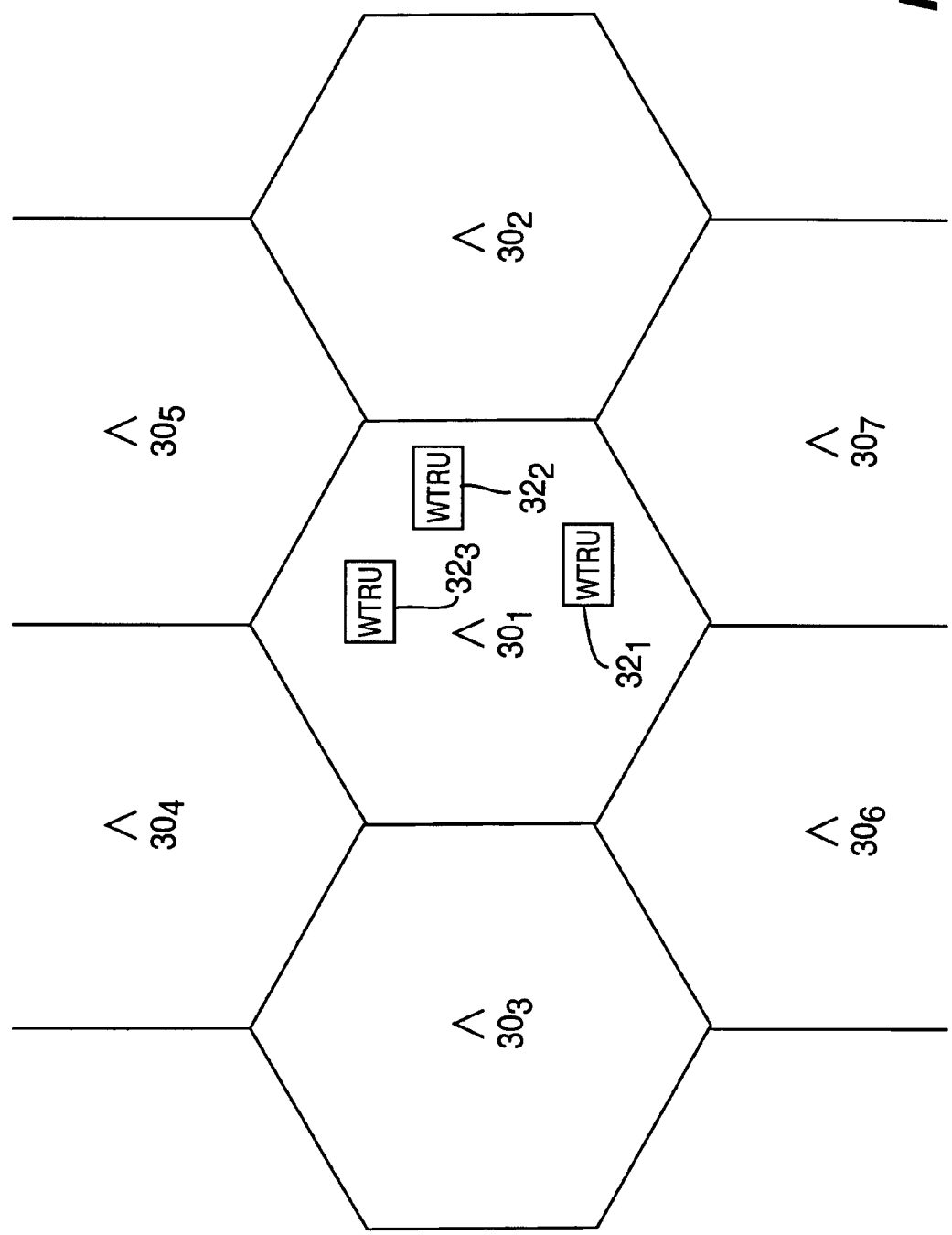
FIG. 1 illustrates a prior art TDD system.
Figure 2:
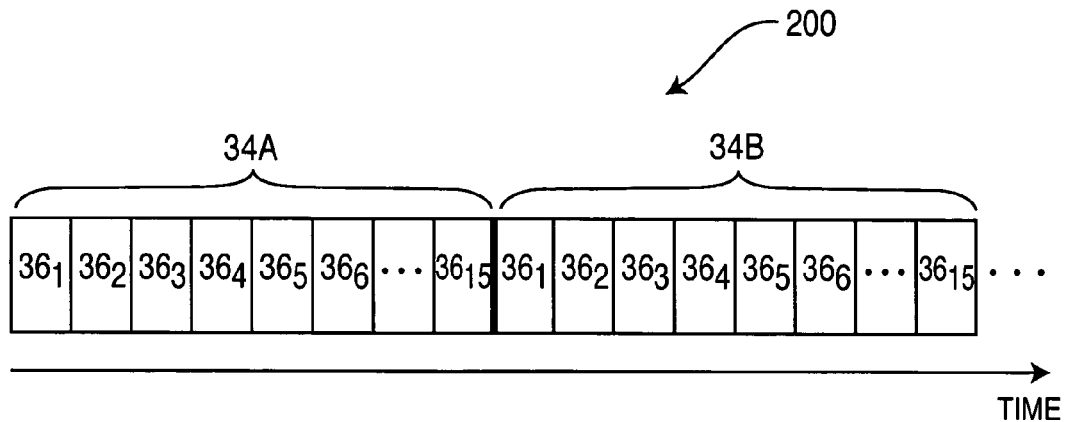
FIG. 2 illustrates time slots in repeating frames of a TDD system.

The present invention will be described with reference to the drawing figures wherein like numerals represent like elements throughout. A repeating frame 34 of with time slots $36_1$-$36_{15}$ of a TDD system is illustrated in FIG. 2. The first slot $36_1$ represents a beacon channel and is used as the pathloss (or channel condition) measurement slot. A WTRU will receive and take measurements of the beacon channel. The WTRU will make uplink reports of the measurements to the node B and the node B will make power adjustments accordingly. It should be noted that the system may also designate other slots as the power control slots.

To better understand the present invention, an outer loop power control equation will first be discussed to show the importance of beacon to slot location allocation. An example of an equation to derive a transmitting station's transmission power is depicted as per Equation 1:

$$P_{TS} = SIR_{TARGET} + I_{RS} + \alpha(L - L_0) + L_0 + \text{CONSTANT\_VALUE} \quad \text{Equation 1}$$

where $P_{TS}$ is transmission power level in decibels, $SIR_{TARGET}$ is the target signal to interference ratio, which is a value determined on received target adjustment signals, $I_{RS}$ is the measure of the interference power level at the receiving station, $\alpha$ is a weighting measure of the quality of the estimated path loss and is based on the number of time slots between the time slot of the last pathloss estimate and the first time slot of the communication transmitted by the transmitting station, L is a path loss estimate in decibels, $L_0$ is the long term average of the path loss in decibels and is the running average of the pathloss estimate L and CONSTANT\_VALUE is a correction term which corrects for differences in the uplink and downlink channels.

The weighting value of $\alpha$ plays an import factor in the power control algorithm and is assigned a value between zero and one. Generally, if the time difference between the reference beacon and the assigned time slots is small, the recent path loss estimate will be fairly accurate and α is set at a value close to one. By contrast, if the time difference is large, the path loss estimate may not be accurate. Accordingly, α is set at a value closer to zero and is determined as per Equation 2:

$$\alpha = 1 - (D-1)/(D_{max}-1)$$ Equation 2 where the value, D, is the number of time slots between the time slot of the last path loss estimate and the first time slot of the transmitted communication, which is referred to the time slot delay. $D_{max}$ is the maximum number of possible delay slots. If the time slot delay is one time slot, α is one for any size frame. However, if a frame has 15 slots and beacons in slots k and k+8, the maximum number of slots a WTRU can transmit its uplink from a beacon is seven. Table 1 shows the calculated α values for such a 15 slot frame.

TABLE 1

| | Slots away from beacon | | | | | | |
|---|---|---|---|---|---|---|---|
| | 1 | 2 | 3 | 4 | 5 | 6 | 7 |
| α value | 1 | .83 | .66 | .5 | .33 | .166 | 0 |

As shown in Table 1, the α calculation for slots closer to the beacon's transmission use a truer representation of the WTRU's path loss estimate. WTRUs that are assigned slots further from the beacon will have more time to move before sending back power or signal quality information on a earlier received beacon. As stated above, the WTRU may have repositioned itself into a deep null or peak, thus discounting the current path loss estimate and subsequent power correction.

Figure 3:
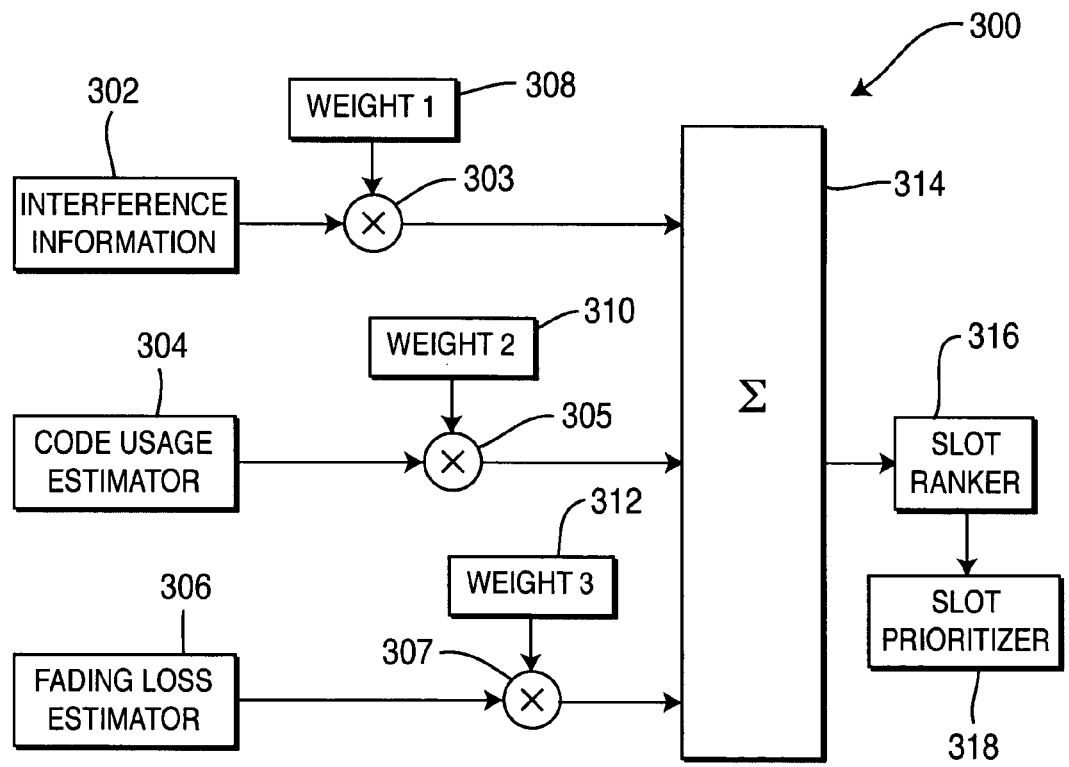
FIG. 3 is a block diagram of a slot allocation system operating in accordance with the present invention.

FIG. 3 is a block diagram of a system 300 which implements a slot allocation process. The system 300 includes an interference information device 302, a code usage estimator device 304, a fading loss estimator device 306, weighting devices 308, 310, 312, multipliers 303, 305, 307, summer 314, slot ranking device 316 and slot prioritization device 318. Each of multipliers 303, 305 and 307 has two inputs and one output. The system 300 may be located within the CRNC.

The signal interference information device 302 is connected to one of the inputs of multiplier 303. The other input of the multiplier 303 is connected to weighting device 308. The output of the multiplier 303 is connected to a first input of summer 314.

The code usage estimator device 304 is connected to one of the inputs of multiplier 305. The other input of the multiplier 305 is connected to weighting device 310. The output of the multiplier 305 is connected to a second input of summer 314.

The fading loss estimator device 306 is connected to one of the inputs of multiplier 307. The other input of the multiplier 307 is connected to weighting device 312. The output of the multiplier 307 is connected to a third input of summer 314. The output of summer 314 is connected to the slot ranking device 316. The output of the slot ranking device 316 is connected to the slot prioritization device 318.

The signal interference information device 302 contains data supplied by interference measuring devices, such as interference signal code power (ISCP) or other time slot/system interference measurements. The code usage estimator device 304 maintains an indication, such as a pseudo image, of the CRNC's slot resource allocation database. The fading loss estimator device 306 operates as a function of the SIR and the desired BLER. For example if it is known that at a certain symbol level has a SIR of 2.5 dB, which is sufficient to obtain a BLER of 0.01, the losses can be defined as the difference between the actual required SIR and that number. The number of samples used to determine the fading loss is preferably a design parameter and would have to be found in extensive simulations or empirical trials The weighting devices 308, 310, 312 are applied to the signal interference information 302, the usage availability estimator 304 and the fading loss estimator 306, respectively, via multipliers 303, 305, 307. The weighting values can be determined by simulation, empirically or by other means. The weighting devices 303, 305, 307 allow an administrator of system 300 to tweak the parameters of the system 300 for optimum performance. The values of the weighting devices 308, 310, 312 are added by summer 314. The slot ranking device 316 ranks the slots according to their combined score. The slot prioritization device 318 then assigns slots having higher priority to slot locations nearest to the reference beacon. The slots with lower priority are assigned to slot locations further away from the reference beacon.

Figure 4:
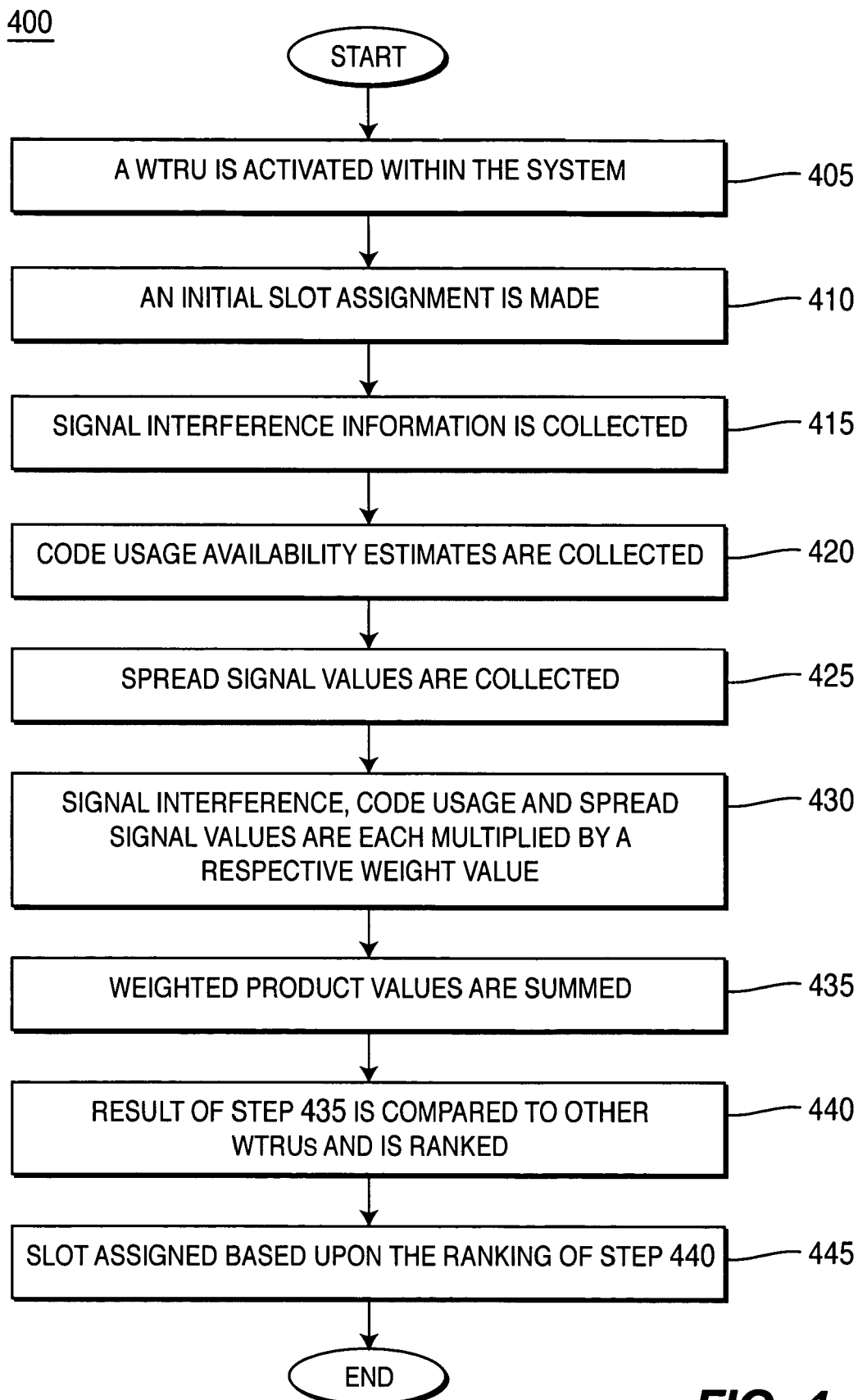
FIG. 4 is a flow chart of a process using signal interference, code usage availability estimates and spread spectrum interference information to assign a slot in accordance with a first embodiment of the present invention.

FIG. 4 is a flow diagram of a process 400 implementing method steps in accordance with one embodiment of the present invention. In step 405, a present WTRU is activated within the system. In step 410, an initial slot assignment is made for the present WTRU. In step 415, signal interference information associated with the present WTRU is collected. In step 420, the present code usage and available estimates of code usage associated with the present WTRU are collected. In step 425, the wireless radio channel spread values associated with the present WTRU are collected, the spread values indicating how much the paths of a given wireless channel are spread in time and/or frequency to, for example, produce the estimated fading loss. In step 430, the signal interference, code usage and spread values are each multiplied by a respective weight value (weight 1, weight 2, weight 3), resulting in three weighted products. In step 435, the weighted products are summed together. In step 440, the result of step 435 is compared to the results of summed weighted products associated with other WTRUs and the present WTRU is ranked accordingly. In step 445, the present WTRU is then assigned a slot based upon the rank determined in step 440.

In another embodiment, it is possible for the Node-B to estimate the channel coefficients directly. This is due to the fact that the spread of the channel corresponds to the channel losses. Therefore, a measure of the spread can be used in producing the fading loss estimate. For example, the smaller the path spread of the channel, the greater the channel loss.

It is also possible to use the Node B to measure Doppler and determine a fading rate, which may also be used for fading loss estimates. A high Doppler value corresponds to deep fading and conversely, a lower Doppler rate corresponds to a more shallow fading. The higher the Doppler rate, the faster the fading rate, i.e., more channel power fluctuation. Faster fading may take a small fraction of the interleaving interval, in which case its effect on the BLER is reduced.

Figure 5:
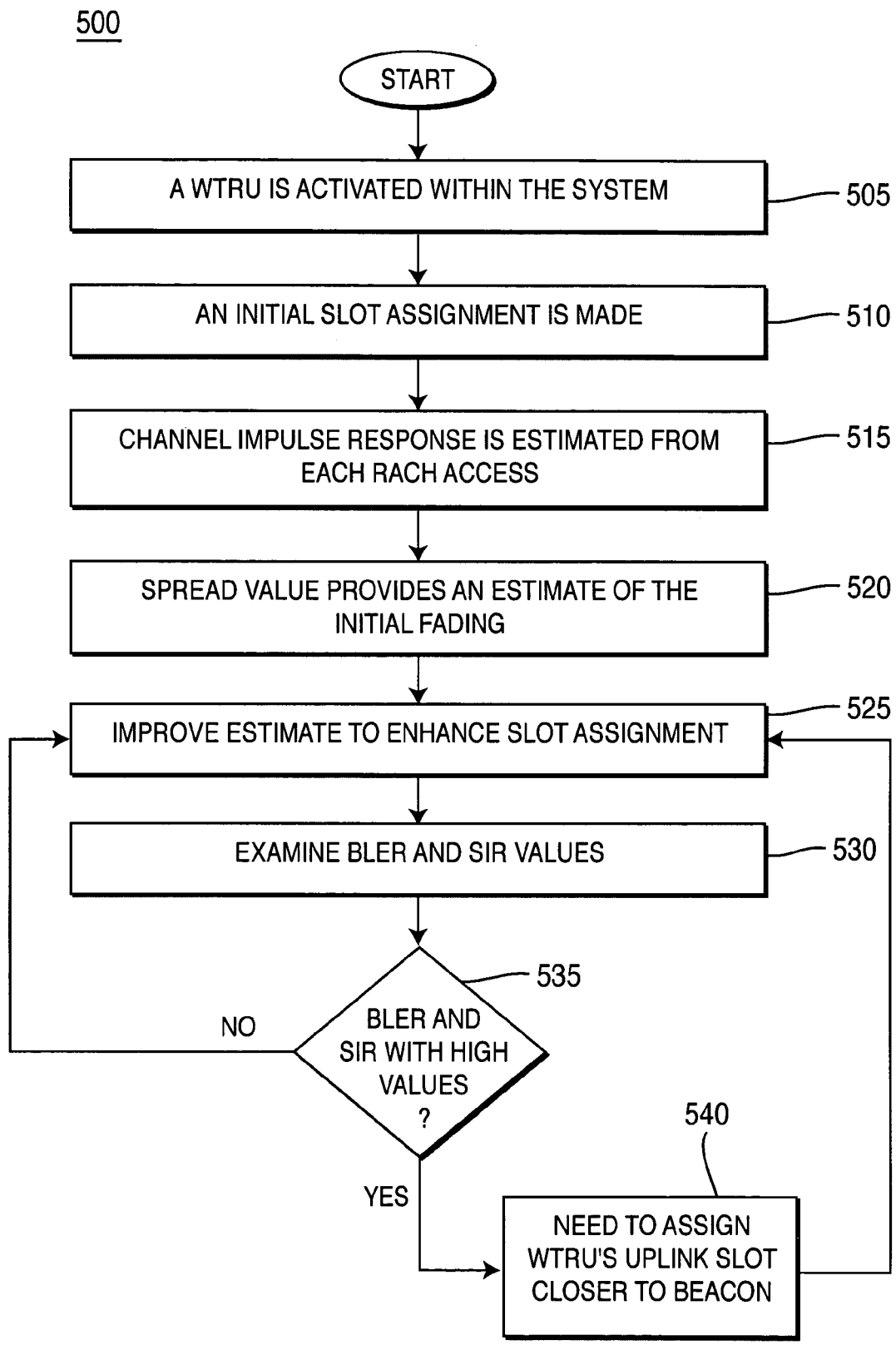
FIG. 5 is a flow chart of a process using BLER and SIR to assign a slot in accordance with a second embodiment of the present invention.

FIG. 5 is a flow diagram of a process 500 implementing method steps in accordance with another embodiment of the present invention. In step 505, a WTRU is activated within the system. In step 510, an initial slot assignment is made for the WTRU. In step 515, a channel impulse response is estimated from each random access channel (RACH) access. In step 520, a spread value provides an estimate of the initial fading. In step 525, the system attempts to improve or enhance the estimate to enhance the slot assignment. In step 530, the system examines the BLER and SIR values. In step 535, a determination is made as to whether the BLER and SIR values are high. If yes, the system assigns the WTRU's uplink slot closer to the beacon in step 540 and returns to step 525. If the BLER and SIR values are not high, the system will return to step 525.

In yet another embodiment, a method for sorting all the WTRUs by α in a coverage area is disclosed. After sorting, the WTRUs are allocated time slots in order to reduce the system's overall fading losses and increase system capacity. A CRNC may allocate all time slots by assigning each WTRU a α value between zero and one. A α of one represents the maximum value of the weighting parameter used in the WTRU power calculation. The α information may be individually signaled to each WTRU. WTRUs with a higher value of beta will be assigned channels closer to the reference beacon.

An additional indicator for fading losses may include vehicular WTRU speed. A direct correlation exists between high WTRU's speed and the worsening multipath fading. Therefore, a high speed WTRU would be indicative of deeper fading.

In a variation of the above embodiment, other parameters that control UL slot location/allocation may include information other than the beta information in this variation of the present invention. For example, WTRUs having a small α value of less than 0.5 will not benefit from higher power control gain even if assigned slots closer to the beacon. In this case, the WTRUs with the larger α values should be closer to the beacon. The α information can be also used as one of the criteria or it can be combined with other criteria, e.g., fading, to determine the optimal UL slot allocation.

In yet another embodiment, a Doppler measurement is utilized. A measurement would be generated by either the channel impulse rate of change or BLER versus the raw BER. The channels with Doppler rates that fall into a median range would be placed nearer the Beacon. Conversely, channels with very high Doppler rates would be placed far from the beacon as they will typically not benefit significantly from power control. Different methods of measuring fading losses may be used in accordance with the present invention.

While this invention has been particularly shown and described with reference to preferred embodiments, it will be understood by those skilled in the art that various changes in form and details may be made therein without departing from the scope of the invention described hereinabove.

What is claimed is:

1. A method of assigning time slots, the method comprising:
    assigning a first time slot to a particular wireless transmit/receive unit (WTRU);
    summing weighted signal interference, code usage and channel spread values associated with the particular WTRU to generate a first combined score;
    determining a slot assignment rank for the particular WTRU by comparing the first combined score to other combined scores associated with other respective WTRUs; and
    assigning a second time slot to the particular WTRU based on the slot assignment rank.

2. A base station for assigning time slots, the base station comprising:
    a plurality of multipliers configured to weight signal interference, code usage and channel spread values associated with a particular wireless transmit/receive unit (WTRU) currently assigned to a first time slot;
    a summer configured to add the weighted signal interference, code usage and channel spread values to generate a first combined score associated with the particular WTRU;
    a slot ranking device configured to determine a slot assignment rank for the particular WTRU by a comparing the first combined score to other combined scores associated with other respective WTRUs; and
    a slot prioritizer for assigning a second time slot to the particular WTRU based on the slot assignment rank.

3. A wireless transmit/receive unit (WTRU) for assigning time slots, the WTRU comprising:
    a plurality of multipliers configured to weight signal interference, code usage and channel spread values associated with a first communication station currently assigned to a first time slot;
    a summer configured to add the weighted signal interference, code usage and channel spread values to generate a first combined score associated with the first communication station;
    a slot ranking device configured to determine a slot assignment rank for the first communication station by a comparing the first combined score to other combined scores associated with other respective communication stations; and
    a slot prioritizer for assigning a second time slot to the first communication station based on the slot assignment rank.

4. An integrated circuit (IC) for assigning time slots, the IC comprising:
    a plurality of multipliers configured to weight signal interference, code usage and channel spread values associated with a first communication station currently assigned to a first time slot;
    a summer configured to add the weighted signal interference, code usage and channel spread values to generate a first combined score associated with the first communication station;
    a slot ranking device configured to determine a slot assignment rank for the first communication station by a comparing the first combined score to other combined scores associated with other respective communication stations; and
    a slot prioritizer for assigning a second time slot to the first communication station based on the slot assignment rank.

* * * * *

UNITED STATES PATENT AND TRADEMARK OFFICE
CERTIFICATE OF CORRECTION

PATENT NO. : 7,492,735 B2  Page 1 of 1
APPLICATION NO. : 10/718387
DATED : February 17, 2009
INVENTOR(S) : Zeira et al.

It is certified that error appears in the above-identified patent and that said Letters Patent is hereby corrected as shown below:

TITLE PAGE

Item (75), Inventors, after "Eldad Zeira", delete "Hungtington" and insert therefor --Huntington--.

At column 2, line 43, after "881.52" delete "Mhz" and insert therefor --MHz--.

At column 2, line 60, after the word "located" delete "temporally" and insert therefor --temporarily--.

At column 4, line 16, after the word "units", delete "Generally, the term base station includes but is not limited to a base station, Node-B, site controller, access point or other interfacing device in a wireless environment.".

At column 4, line 35, before the word "with" delete "of".

At column 4, line 65, before the word "factor" delete "import" and insert therefor --important--.

At column 5, line 10, after the words "referred to" insert --as--.

At column 5, line 15, after the word "transmit" delete "its".

At column 5, line 66, after the word "level" delete "has".

Signed and Sealed this

Nineteenth Day of May, 2009

JOHN DOLL
*Acting Director of the United States Patent and Trademark Office*